(12) United States Patent
Wood et al.

(10) Patent No.: US 12,258,875 B2
(45) Date of Patent: Mar. 25, 2025

(54) AIRFOIL FOR A TURBOFAN ENGINE

(71) Applicant: General Electric Company, Schenectady, NY (US)

(72) Inventors: Trevor Howard Wood, Clifton Park, NY (US); Kishore Ramakrishnan, Rexford, NY (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/618,081

(22) Filed: Mar. 27, 2024

(65) Prior Publication Data

US 2024/0263565 A1 Aug. 8, 2024

Related U.S. Application Data

(62) Division of application No. 17/828,112, filed on May 31, 2022, now Pat. No. 11,965,425.

(51) Int. Cl.
*F01D 25/04* (2006.01)
*B64D 33/02* (2006.01)
(Continued)

(52) U.S. Cl.
CPC ............. *F01D 25/04* (2013.01); *F01D 5/141* (2013.01); *F01D 5/145* (2013.01); *F01D 5/18* (2013.01);
(Continued)

(58) Field of Classification Search
CPC . F01D 5/18; F01D 5/141; F01D 5/145; F01D 9/041; F01D 25/04; F02K 1/827;
(Continued)

(56) References Cited

U.S. PATENT DOCUMENTS 3,035,657 A 5/1962 Lemon
3,070,198 A 12/1962 Haskell
(Continued)

FOREIGN PATENT DOCUMENTS

EP 0405581 B1 10/1993
EP 0839101 B1 5/1998
(Continued)

OTHER PUBLICATIONS

Bertolucci, An Experimental Investigation of the Grazing Flow Impedance Duct at the University of Florida for Acoustic Liner Applications, University of Florida Dissertation, 2012, 217 Pages.
(Continued)

*Primary Examiner* — Brian Christopher Delrue
(74) *Attorney, Agent, or Firm* — Dority & Manning, P.A.

(57) ABSTRACT

An airfoil is provided defining a spanwise direction, a chordwise direction, a root end, a tip end, a leading edge end, and a trailing edge end. The airfoil includes: a leading edge extending from the leading edge end; a body extending along the spanwise direction between the root end and the tip end, the body including a plurality of cavity walls defining a plurality of cavities, each of the plurality of cavities having an inlet located at the leading edge; and a porous face sheet positioned on at least one inlet of the plurality of cavities.

20 Claims, 8 Drawing Sheets

(51) Int. Cl.
  *F01D 5/14* (2006.01)
  *F01D 5/18* (2006.01)
  *F01D 9/04* (2006.01)
  *F02K 1/82* (2006.01)
  *G10K 11/16* (2006.01)

(52) U.S. Cl.
  CPC .............. *F01D 9/041* (2013.01); *F02K 1/827* (2013.01); *G10K 11/16* (2013.01); *B64D 2033/0226* (2013.01); *F05D 2240/121* (2013.01); *F05D 2250/184* (2013.01); *F05D 2260/96* (2013.01); *F05D 2260/961* (2013.01)

(58) Field of Classification Search
  CPC ............ G10K 11/16; B64D 2033/0226; F05D 2240/121; F05D 2250/184; F05D 2260/96
  See application file for complete search history.

(56) References Cited

U.S. PATENT DOCUMENTS

| | | |
|---|---|---|
| 3,232,371 A | 2/1966 | Reichert et al. |
| 3,734,234 A | 5/1973 | Wirt |
| 3,803,754 A | 4/1974 | Fischer |
| 3,819,009 A | 6/1974 | Mot |
| 3,820,628 A * | 6/1974 | Hanson .................. F02K 1/827 181/220 |
| 3,831,710 A | 8/1974 | Wirt |
| 3,850,261 A | 11/1974 | Hehmann et al. |
| 3,905,443 A | 9/1975 | Sieuzac |
| 3,913,702 A | 10/1975 | Wirt et al. |
| 4,001,473 A | 1/1977 | Cook |
| 4,035,535 A | 7/1977 | Taylor |
| 4,074,496 A | 2/1978 | Fischer |
| 4,141,433 A | 2/1979 | Warnaka |
| 4,243,117 A | 1/1981 | Warnaka |
| 4,265,955 A | 5/1981 | Harp et al. |
| 4,291,080 A | 9/1981 | Ely et al. |
| 4,298,090 A | 11/1981 | Chapman |
| 4,339,018 A | 7/1982 | Warnaka |
| 4,551,110 A | 11/1985 | Selvage et al. |
| 4,676,762 A | 6/1987 | Ballard |
| 5,353,502 A | 10/1994 | Hattori et al. |
| 5,445,861 A | 8/1995 | Newton et al. |
| 5,480,729 A | 1/1996 | Hattori et al. |
| 5,690,035 A | 11/1997 | Hatayama et al. |
| 5,959,264 A | 9/1999 | Brück et al. |
| 6,004,095 A * | 12/1999 | Waitz .................. F02K 1/28 415/115 |
| 6,182,787 B1 | 2/2001 | Kraft et al. |
| 6,200,664 B1 | 3/2001 | Figge et al. |
| 6,203,269 B1 | 3/2001 | Lorber et al. |
| 6,203,656 B1 | 3/2001 | Syed |
| 6,206,136 B1 | 3/2001 | Swindlehurst et al. |
| 6,209,679 B1 | 4/2001 | Hogeboom et al. |
| 6,256,959 B1 | 7/2001 | Palmersten |
| 6,630,093 B1 | 10/2003 | Jones |
| 6,764,276 B2 | 7/2004 | Mulcaire et al. |
| 6,772,857 B2 | 8/2004 | Porte et al. |
| 6,840,349 B2 | 1/2005 | Andre et al. |
| 6,871,725 B2 | 3/2005 | Johnson |
| 6,884,486 B2 | 4/2005 | Estrin et al. |
| 6,913,570 B2 | 7/2005 | Kehrle |
| 6,969,236 B2 * | 11/2005 | Giesler ................ F16J 15/3404 415/230 |
| 7,105,127 B2 | 9/2006 | Vatchiants |
| 7,334,998 B2 | 2/2008 | Jones et al. |
| 7,410,455 B2 | 8/2008 | Akishev et al. |
| 7,484,592 B2 | 2/2009 | Porte et al. |
| 7,510,052 B2 | 3/2009 | Ayle |
| 7,866,377 B2 | 1/2011 | Slaughter |
| 7,906,205 B2 | 3/2011 | Meres |
| 7,921,966 B2 | 4/2011 | Chiou et al. |
| 7,935,205 B2 | 5/2011 | Bogue et al. |
| 7,954,224 B2 | 6/2011 | Douglas |
| 7,963,362 B2 | 6/2011 | Lidoine |
| 7,967,108 B2 | 6/2011 | Harper |
| 7,971,684 B2 | 7/2011 | Gantie et al. |
| 8,016,230 B2 | 9/2011 | Fogarty et al. |
| 8,016,561 B2 | 9/2011 | Moniz et al. |
| 8,047,326 B2 | 11/2011 | Valleroy et al. |
| 8,333,552 B2 | 12/2012 | Wood et al. |
| 8,464,831 B2 | 6/2013 | Olander Burak et al. |
| 8,579,076 B2 | 11/2013 | Ayle et al. |
| 8,689,936 B2 | 4/2014 | Richter |
| 8,784,592 B2 | 7/2014 | Kolax et al. |
| 8,789,652 B2 | 7/2014 | Swallowe et al. |
| 8,905,189 B2 | 12/2014 | Ayle et al. |
| 8,985,513 B2 | 3/2015 | Dean et al. |
| 8,997,923 B2 | 4/2015 | Ichihashi |
| 9,175,474 B2 | 11/2015 | May et al. |
| 9,222,229 B1 | 12/2015 | Chang et al. |
| 9,284,726 B2 | 3/2016 | Tien |
| 9,290,274 B2 | 3/2016 | Roach et al. |
| 9,296,044 B2 | 3/2016 | Douglas |
| 9,302,869 B2 | 4/2016 | Kendrick et al. |
| 9,365,022 B2 | 6/2016 | Kendrick et al. |
| 9,378,721 B2 | 6/2016 | Zalewski et al. |
| 9,514,734 B1 | 12/2016 | Jones et al. |
| 9,546,602 B2 | 1/2017 | Julliard et al. |
| 9,607,600 B2 | 3/2017 | Swallowe et al. |
| 9,693,166 B2 | 6/2017 | Herrera et al. |
| 9,759,447 B1 | 9/2017 | Mathur |
| 9,909,471 B2 | 3/2018 | Mattia |
| 9,978,354 B2 | 5/2018 | Nampy |
| 10,032,445 B1 | 7/2018 | Linch et al. |
| 10,107,139 B1 | 10/2018 | Jones et al. |
| 10,174,675 B2 | 1/2019 | Martinez et al. |
| 10,301,942 B2 | 5/2019 | Joseph et al. |
| 10,655,538 B2 | 5/2020 | Gilson et al. |
| 11,001,389 B2 * | 5/2021 | Hinderliter ............ B64D 27/24 |
| 2004/0048027 A1 | 3/2004 | Hayes et al. |
| 2010/0307867 A1 | 12/2010 | Ogawa et al. |
| 2011/0100749 A1 | 5/2011 | Nonogi et al. |
| 2011/0244213 A1 | 10/2011 | Jones |
| 2013/0306402 A1 | 11/2013 | Todorovic |
| 2014/0133964 A1 | 5/2014 | Ayle |
| 2014/0251481 A1 | 9/2014 | Kroll et al. |
| 2014/0305529 A1 | 10/2014 | Kroll et al. |
| 2014/0341744 A1 | 11/2014 | Cazuc et al. |
| 2015/0027629 A1 | 1/2015 | Butler et al. |
| 2015/0044413 A1 | 2/2015 | Vauchel et al. |
| 2015/0064015 A1 | 3/2015 | Perez |
| 2015/0110603 A1 | 4/2015 | Biset et al. |
| 2015/0292413 A1 | 10/2015 | Soria et al. |
| 2015/0373470 A1 | 12/2015 | Herrera et al. |
| 2016/0010863 A1 | 1/2016 | Ott et al. |
| 2016/0017775 A1 | 1/2016 | Mattia |
| 2016/0017810 A1 | 1/2016 | Lord et al. |
| 2016/0067938 A1 | 3/2016 | Goodrich |
| 2016/0109130 A1 | 4/2016 | Stastny et al. |
| 2016/0123160 A1 | 5/2016 | Strock et al. |
| 2016/0319690 A1 | 11/2016 | Lin et al. |
| 2017/0043550 A1 | 2/2017 | Coïc et al. |
| 2017/0045059 A1 | 2/2017 | Care et al. |
| 2017/0072638 A1 | 3/2017 | Hayes et al. |
| 2017/0191414 A1 | 7/2017 | Martinez et al. |
| 2018/0016987 A1 | 1/2018 | Howarth et al. |
| 2018/0162542 A1 | 6/2018 | VanDeMark et al. |
| 2018/0174568 A1 | 6/2018 | Porte et al. |
| 2018/0218723 A1 | 8/2018 | Lin et al. |
| 2018/0245516 A1 | 8/2018 | Howarth et al. |
| 2019/0080679 A1 | 3/2019 | Alstad |
| 2019/0270504 A1 * | 9/2019 | Cedar .................... B64C 1/066 |
| 2020/0049068 A1 | 2/2020 | Lin et al. |
| 2020/0109664 A1 | 4/2020 | Herman et al. |
| 2020/0200017 A1 * | 6/2020 | Taylor .................... F01D 5/16 |
| 2020/0309028 A1 | 10/2020 | Murugappan et al. |
| 2021/0003074 A1 | 1/2021 | Gea Aguilera ......... B64D 33/02 |
| 2022/0010731 A1 * | 1/2022 | Bifulco .................. F01D 25/24 |

(56) References Cited

U.S. PATENT DOCUMENTS

| | | | | |
|---|---|---|---|---|
| 2022/0049621 A1* | 2/2022 | Sawyers-Abbott | ..... | F01D 9/041 |
| 2022/0162952 A1* | 5/2022 | Zaccardi | ................ | F02C 7/185 |

FOREIGN PATENT DOCUMENTS

| | | | | |
|---|---|---|---|---|
| FR | 3092622 A1 * | 8/2020 | ............. | F01D 25/12 |
| GB | 2361035 A | 10/2001 | | |
| JP | S58156052 U | 10/1983 | | |
| JP | H0333897 A | 2/1991 | | |
| WO | WO2016/0133501 A1 | 8/2016 | | |

OTHER PUBLICATIONS

Bielak et al., Advanced Nacelle Acoustic Lining Concepts Development, NASA, CR-2002-211672, Aug. 2002, Total pp. 203.

Dai et al., Acoustic of a Perforated Liner with Grazing Flow: Floquet-Bloch Periodical Approach Versus Impedance Continuous Approach, Research Gate, The Journal of the Acoustical Society of America, Sep. 2016, 10 Pages. http://dx.doi.org/10.1121/1.4962490.

Dannemann et al., Experimental Study of Advanced Helmholtz Resonator Liners with Increased Acoustic Performance by Utilising Material Damping Effects, Applied Sciences, 2018, 18 Pages.

Guo et al., Far Term Noise Reduction Roadmap for the Mid-Fuselage Nacelle Subsonic Transport, AIAA-2016-2787, NASA American Institute of Aeronautics and Astronautics, 2019, 25 Pages. https://ntrs.pasa.gov/api/citations/20190027212/downloads/20190027212.pdf.

Jones, et al., Evaluation of Parallel-Element, Variable-Impedance, Broadband Acoustic Liner Concepts, AIAA-2012-2194, Jun. 2012, 17 Pages.

Jones, et al., Evaluation of Novel Liner Concepts for Fan and Airframe Noise Reduction, AIAA-2009-3142, NASA American Institute of Aeronautics and Astronautics, 2016, 18 Pages. https://ntrs.nasa.gov/api/citations/20160009098/downloads/20160009098.pdf.

Kors et al., OPtimisation for Low Environmental Noise Impact AIRcraft—Openair, SAFRAN, Senecma France, 2014, 8 Pages. http://www.acoustics.asn.au/conference_proceedings/INTERNOISE2014/papers/p279.pdf.

Kraft et al., Acoustic Treatment Design Scaling Methods, vol. 2: Advanced Treatment Impedance Models for High Frequency Ranges, NASA, CR-1999-209120, vol. 2, 1999, Total pp. 98.

Lawn, Acoustic Pressure Losses in Woven Screen Regenerators, ResearchGate, Applied Acoustics, vol. 77, Mar. 2014, pp. 42-48.

Malmary et al., Acoustic Impedance Measurement with Grazing Flow, AIAA-2001-2193, $7^{th}$ AIAA/CEAS Aeroacoustics Conference, May 2001, Netherlands, 9 Pages.

Martinson, Mechanical Design for 3D Printing, Nov. 2012, 15 pages. http://eikimartinson.com/engineering/3dparts/#dovetail.

Motsinger et al., Design and Performance of Duct Acoustic Treatment, NASA, N92-14783, 1991, pp. 165-206. https://ntrs.nasa.gov/archive/nasa/casi.ntrs.nasa.gov/19920005565.pdf.

Nark et al., Acoustic Liner Overview, Acoustics Technical Working Group Meeting, Nasa Langley Research Center, Cleveland, Oct. 22-23, 2019, pp. 1-25.

Primus et al., ONERA-NASA Cooperative Effort on Liner Impedance Education, AIAA 2013-2273, Research Gate, $19^{th}$ AIAA/CEAS Aeroacoustics Conference, May 2013, Germany, 16 Pages.

Schiller et al., Experimental Evaluation of Acoustic Engine Liner Models Developed with COMSOL Multiphysics, $23^{rd}$ American Institute of Aeronautics and Astronautics, DEAS Aeroacoustics Conference, NASA, 2017, 25 Pages. https://ntrs.nasa.gov.archive/nasa/casi.ntrs.nasa.gov/20170005768.pdf.

Sellen et al., Noise Reduction In a Flow Duct: Implementation of a Hybrid Passive/Active Solution, Science Direct, Journal of Sound and Vibration, vol. 297, 2006, pp. 492-511.

Soderman et al., Design and Development of a Deep Acoustic Lining for the 40- by 80 Foot Wind Tunnel Test Station, NASA TP-2002-211850, Nov. 2002, 61 Pages.

Syed et al., Paper No. 07ATC-43 Development of the Acousti-Cap TM Technology Double-Layer Acoustic Liners in Aircraft Engine Nacelles, Research Gate, 2007 SAE International, 23 Pages.

Tam et al., Experimental Validation of Numerical Simulations for An Acoustic Liner in Grazing Flow, 30 Pages. https://ntrs.nasa.gov/archive/nasa/casi.ntrs.nasa.gov/20130014086.pdf.

Tam et al., Numerical Simulation of a Slit Resonator in a Grazing Flow, AIAA 2006-799, $44^{th}$ AIAA Aerospace Meeting and Exhibit, Nevada, 2006, 20 Pages.

Zhang, Numerical Simulation of Two-Dimensional Acoustic Liners with High Speed Grazing Flow, MS Thesis, Urbana, Illinois, 2010, 90 Pages.

Zhou, Acoustic Characterization of Orifices and Perforated Liners with Flow and High-Level Acoustic Excitation, DiVA Digitala Vetenskapliga Arkivet, KTH Royal Institute of Technology School of Engineering Sciences (SCI), Aeronautical and Vehicle Engineering, MWL Flow Acoustics, Doctoral Thesis, Stockholm, p. vi, 2015 , 70 Pages. http://www.diva-portal.org/smash/record.jsf?pid=diva2:813073.

* cited by examiner

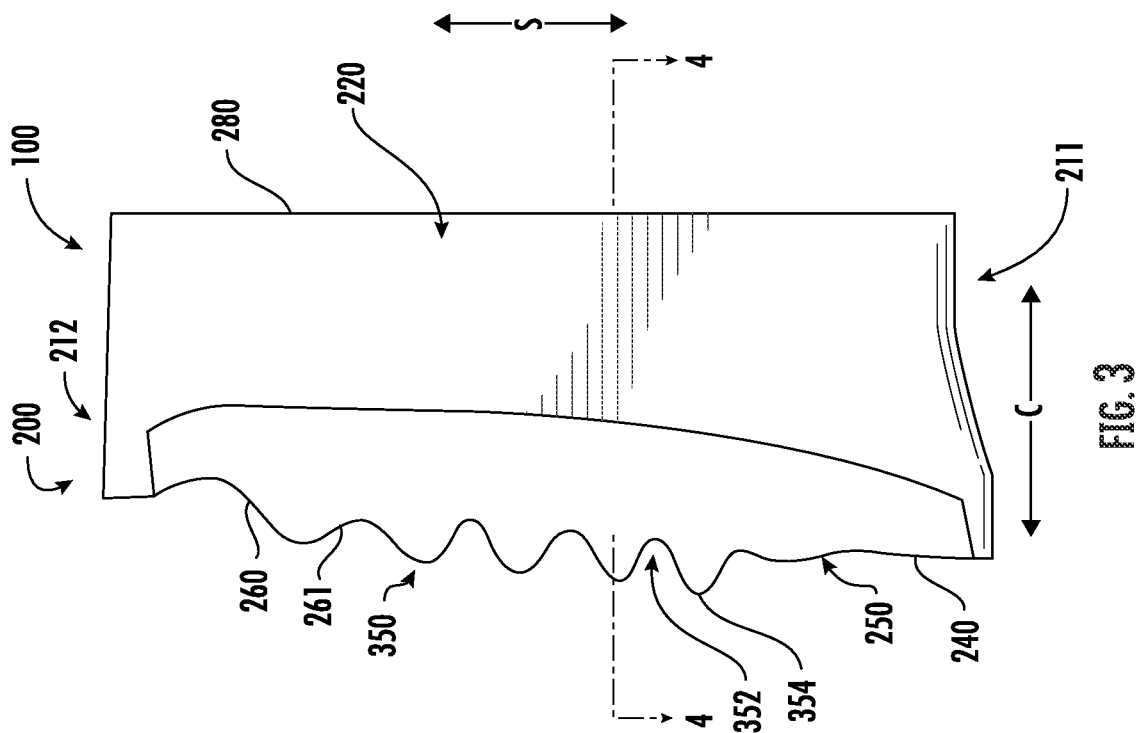
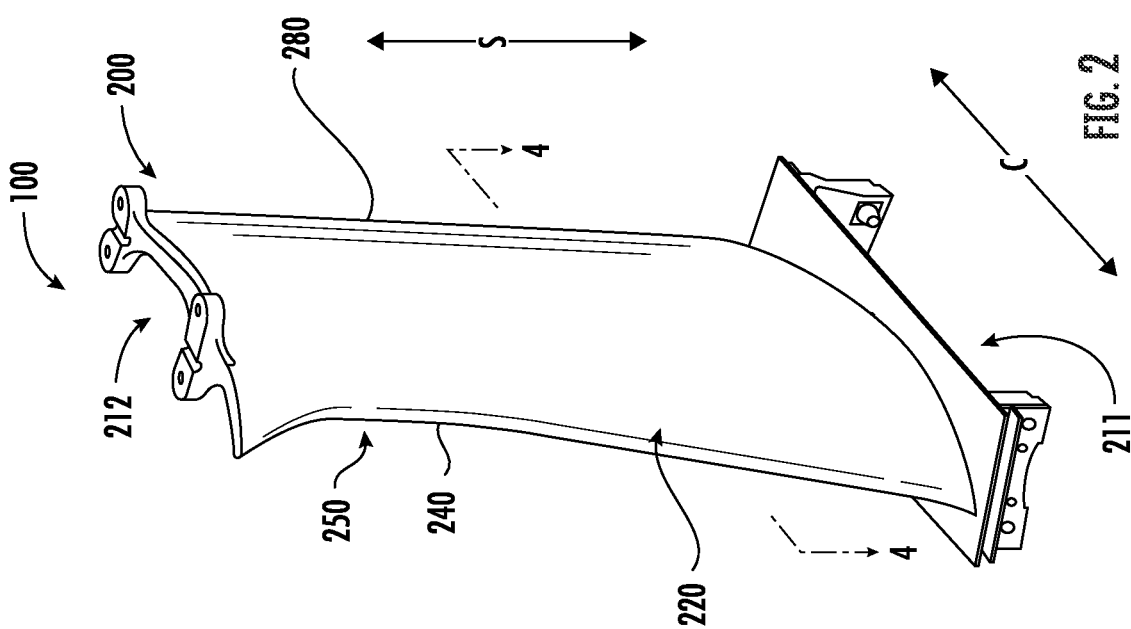

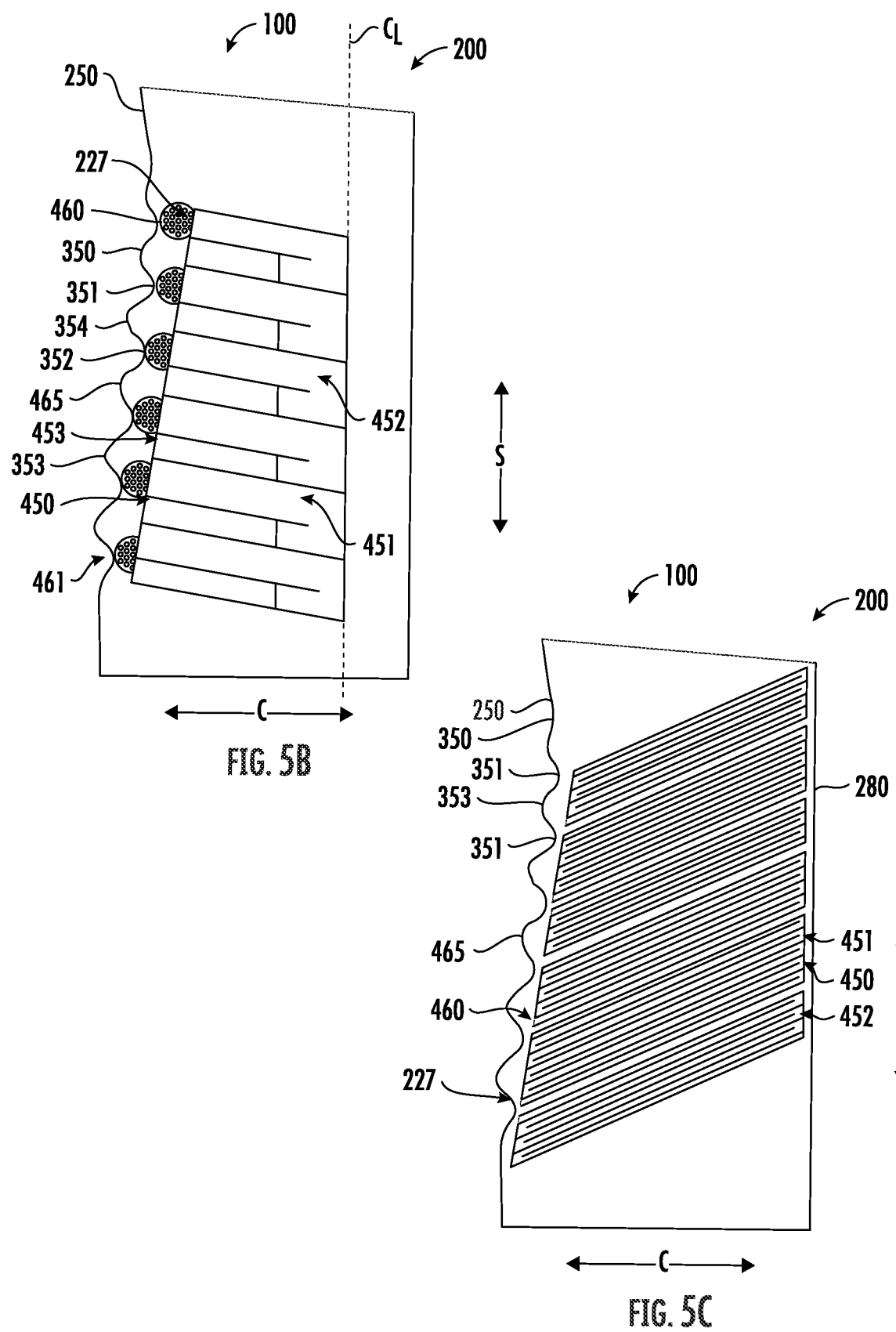

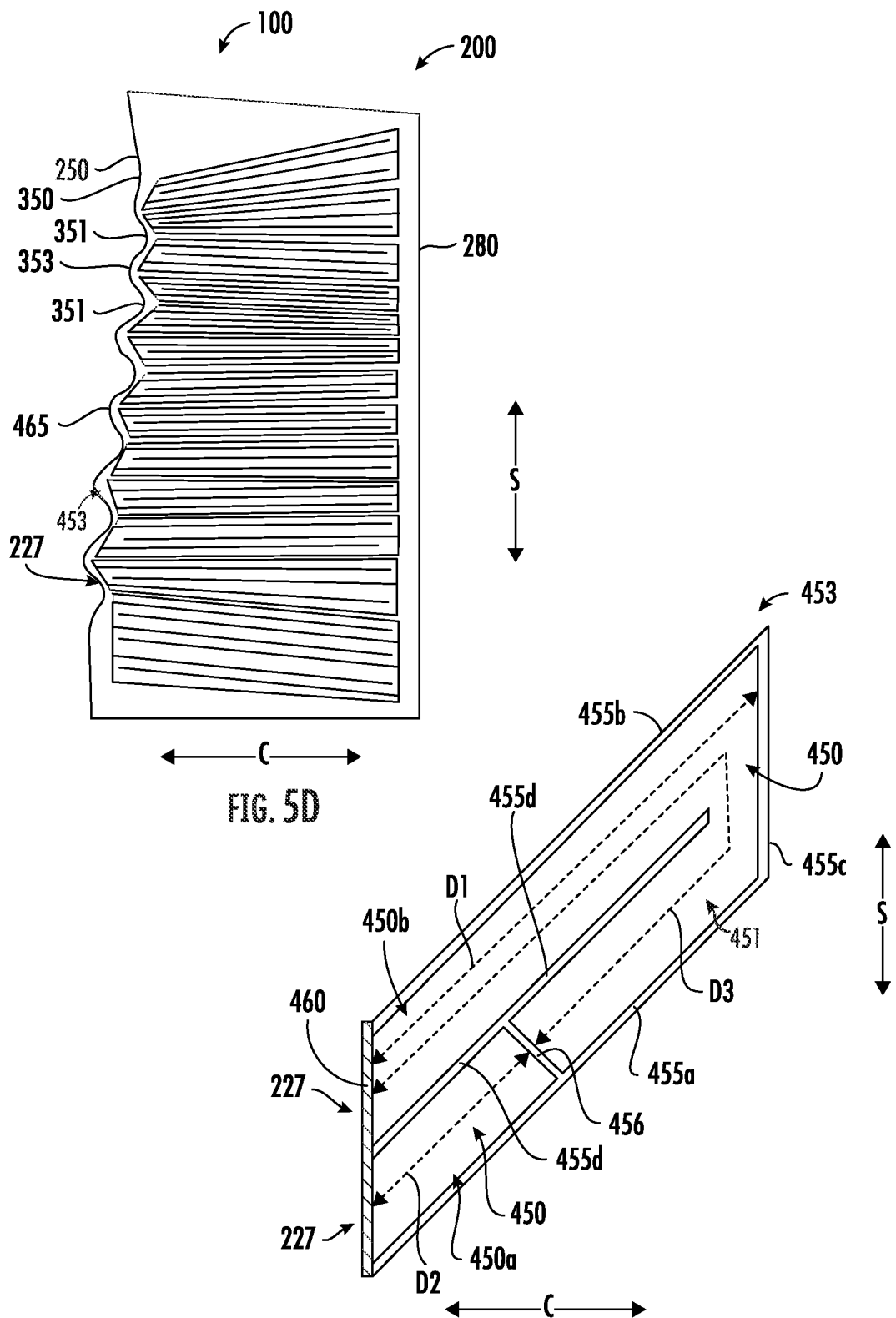

AIRFOIL FOR A TURBOFAN ENGINE

CROSS-REFERENCE TO RELATED APPLICATIONS

The present application is a divisional of and claims priority to U.S. application Ser. No. 17/828,112 entitled "AIRFOIL FOR A TURBOFAN ENGINE", filed May 31, 2022, the entire disclosure of which is hereby expressly incorporated by reference herein.

FIELD

The present subject matter relates generally to an airfoil. More specifically, the present subject matter relates to an outlet guide vane of a turbofan engine.

BACKGROUND

A turbofan engine, which is a type of propulsion system, generally includes a fan and a turbomachine arranged in flow communication with one another. Additionally, the turbomachine of the turbofan engine generally includes, in serial flow order, a compressor section, a combustion section, and a turbine section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

The fan includes a plurality of circumferentially spaced fan blades extending radially outward from a rotor disk. Rotation of the fan blades creates an airflow through the inlet to the turbomachine, as well as an airflow over the turbomachine. For certain turbofan engines, a plurality of outlet guide vanes are provided downstream of the fan for straightening the airflow from the fan to increase, e.g., an amount of thrust generated by the fan.

Other propulsion systems, such as a hybrid-electric turbofan engine or an electric propulsion system, can include an electrically driven fan. These propulsion systems can include airfoils, such as a plurality of outlet guide vanes that are provided downstream of the electrically driven fan.

Improvements to the outlet guide vanes, and other airfoils within the propulsion system, would be welcomed in the art.

BRIEF DESCRIPTION OF THE DRAWINGS

A full and enabling disclosure, including the best mode thereof, directed to one of ordinary skill in the art, is set forth in the specification, which makes reference to the appended figures, in which:

FIG. 2 is a perspective view of an airfoil in accordance with an exemplary embodiment.

FIG. 3 a side view of an airfoil in accordance with an exemplary embodiment.

FIG. 5B is a schematic, cross-sectional, side view of an airfoil in accordance with an exemplary embodiment.

FIG. 5C is a schematic, cross-sectional, side view of an airfoil in accordance with an exemplary embodiment.

FIG. 5D is a schematic, cross-sectional, side view of an airfoil in accordance with an exemplary embodiment.

FIG. 6A is a schematic, cross-sectional, side view of a cavity group of the airfoil of FIG. 5A, FIG. 5B, FIG. 5C, or FIG. 5D in accordance with an exemplary embodiment.

DETAILED DESCRIPTION

Figure 1:
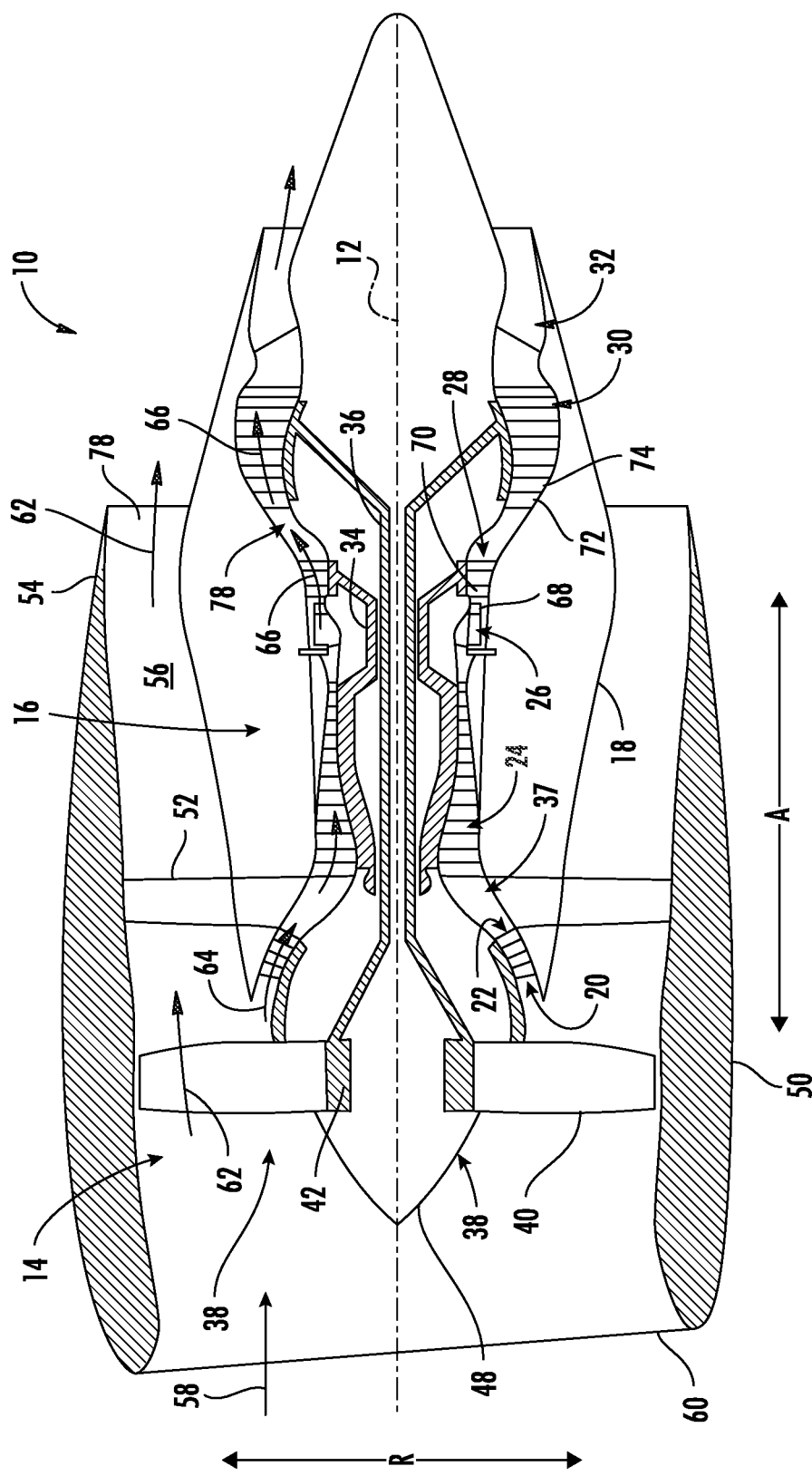
FIG. 1 is a schematic cross-sectional view of a turbofan engine in accordance with an exemplary embodiment.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the embodiment.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "forward", "foremost", and "aft" refer to relative positions within a turbofan engine or vehicle, and refer to the normal operational attitude of the turbofan engine or vehicle. For example, with regard to a turbofan engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

In certain aspects of the present disclosure, an airfoil for a turbofan engine is provided. The airfoil generally includes a plurality of cavities disposed within a body of the airfoil, each of the plurality of cavities having an inlet located at a leading edge of the airfoil. The airfoil also generally includes a porous face sheet positioned on at least one inlet of the plurality of cavities. An airfoil with the porous face sheet positioned on at least one inlet of the plurality of cavities may provide for reduced noise. When the airfoil is an outlet guide vane for example of the turbofan engine, the airfoil may provide for reduced wake-vane interaction noise of the turbofan engine.

Placing cavities with inlets located at the leading edge of the airfoil may reduce the amount of noise generated while reducing the amount of surface area that includes the inlets and/or the porous face sheet. Reducing the amount of surface area that includes the inlets and/or the porous face sheet can improve the aerodynamic performance of the airfoil. Alternatively, by placing cavities with inlets located at the leading edge as well as placing cavities with inlets located at locations downstream from the leading edge could allow for significantly greater combined noise attenuation than if the leading edges were left untreated.

In certain exemplary aspects, the leading edge may define a plurality of peaks and a plurality of valleys alternatingly arranged along the spanwise direction of the airfoil. The inlets of the plurality of cavities can be positioned in the plurality of valleys and a porous face sheet can be positioned on each of the inlets of the plurality of cavities. The plurality of peaks, in some examples, do not include inlets of the plurality of cavities and/or the porous face sheets, as such, the plurality of peaks include impermeable surfaces. Including the inlets of the cavities in the valleys and including impermeable surfaces in the peaks may provide for reduced noise generated by the airfoil.

In certain exemplary aspects, the airfoil may only include the inlets of the cavities and the porous face sheets on a suction side or a pressure side of an airfoil, but not both. Including the inlets of the cavities on only one of the suction side or the pressure side of the airfoil and including impermeable surfaces in the other of the suction side or the pressure side of the airfoil may provide for reduced noise.

Referring now to the drawings, wherein identical numerals indicate the same elements throughout the Figures, FIG. 1 is a schematic cross-sectional view of a turbofan engine in accordance with an exemplary embodiment. More particularly, for the embodiment of FIG. 1, the turbofan engine is a high-bypass turbofan jet engine, referred to herein as "turbofan engine 10." As shown in FIG. 1, the turbofan engine 10 defines an axial direction A (extending parallel to a longitudinal centerline 12 provided for reference), a radial direction R, and a circumferential direction C (see FIG. 2). In general, the turbofan engine 10 includes a fan section 14 and a turbomachine 16 disposed downstream from the fan section 14.

The exemplary turbomachine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22 including the fan. The compressor section, combustion section 26, turbine section, and jet exhaust nozzle section 32 together define a core air flowpath 37.

For the embodiment depicted, the fan section 14 includes a fan 38 having a plurality of fan blades 40 coupled to a rotor disk 42 in a spaced apart manner. As depicted, the fan blades 40 extend outwardly from rotor disk 42 generally along the radial direction R. The rotor disk 42 is covered by a rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the turbomachine 16. It should be appreciated that the nacelle 50 may be configured to be supported relative to the core 16 by a plurality of circumferentially-spaced outlet guide vanes 52. a downstream section 54 of the nacelle 50 may extend over an outer portion of the turbomachine 16 so as to define a bypass airflow passage 56 therebetween.

During operation of the turbofan engine 10, a volume of air 58 enters the turbofan engine 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the core air flowpath 37, or more specifically into the LP compressor 22. The ratio between the first portion of air 62 and the second portion of air 64 is commonly known as a bypass ratio. The pressure of the second portion of air 64 is then increased as it is routed through the HP compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan engine 10, also providing propulsive thrust. The HP turbine 28, the LP turbine 30, and the jet exhaust nozzle section 32 at least partially define a hot gas path 78 for routing the combustion gases 66 through the turbomachine 16.

It should be appreciated, however, that the exemplary turbofan engine 10 depicted in FIG. 1 is by way of example only, and that in other exemplary embodiments, the turbofan engine 10 may have any other suitable configuration. For example, in other exemplary embodiments, the fan 38 may be configured as a variable pitch fan including, e.g., a suitable actuation assembly for rotating the plurality of fan blades about respective pitch axes, the turbofan engine 10 may be configured as a geared turbofan engine having a reduction gearbox between the LP shaft 36 and fan section 14, etc. It should also be appreciated, that in still other exemplary embodiments, aspects of the present disclosure may be incorporated into any other suitable turbofan engine. For example, in other exemplary embodiments, aspects of the present disclosure may be incorporated into other propulsion systems, such as a turboprop engine, or an unducted or open fan engine. The unducted or open fan engine may be a contra-rotating open rotor fan engine or a single-rotation open fan engine. In another example, aspects of the present disclosure may be incorporated into other airfoils, such as a wing of an aircraft, a strut, or a pylon, which can connect a propulsion system to the airframe of an aircraft.

Referring now to FIG. 2, a perspective view of an airfoil 200 in accordance with an exemplary embodiment is provided. More specifically, FIG. 2 provides a perspective view of an outlet guide vane 100 of the plurality of circumferentially-spaced outlet guide vanes 52 (FIG. 1), according to an example embodiment. Even though the airfoil 200 will be described frequently as an airfoil for a turbofan engine, such as turbofan engine 10, the airfoil 200 can also be an airfoil for other propulsion systems, such as an airfoil for a hybrid electric propulsion system or an airfoil for an electric propulsion system. Even more specifically, the airfoil 200 can be an outlet guide vane for a turbofan engine, a hybrid electric propulsion system, or an electric propulsion system.

The airfoil 200, such as the outlet guide vane 100, defines a spanwise direction S, which may generally align with a radial direction of a turbofan engine incorporating the airfoil 200, and a chordwise direction C, as well as a leading edge end 240, and a trailing edge end 280. The airfoil 200 generally includes a body 220 extending along the spanwise direction S between a root end 211 and a tip end 212 of the airfoil 200.

Referring now to FIG. 3, a side view of an airfoil 200 in accordance with an exemplary embodiment is provided. More specifically, FIG. 3 provides a side view of an outlet guide vane 100 of the plurality of circumferentially-spaced outlet guide vanes 52 (FIG. 1), according to another example embodiment. Like the airfoil 200 of FIG. 2, the airfoil 200, such as outlet guide vane 100, in this example defines a spanwise direction S, which may generally align with a radial direction R (FIG. 1) of a turbofan engine incorporating the airfoil 200, and a chord wise direction C, as well as a leading edge end 240, and a trailing edge end 280. The airfoil 200 generally includes a body 220 extending along the spanwise direction S between the root end 211 and the tip end 212 of the airfoil 200.

Referring still to FIG. 3, the airfoil 200 may include a leading edge member 260. Even though not depicted, the airfoil 200 of FIG. 2 can also include a leading edge member 260. The leading edge member 260 can be formed at least in part of a metal material and can be attached to the body 220 at a leading edge 250 of the airfoil 200. As used herein, the leading edge end 240 refers to the specific location of the airfoil 200 that is at the foremost edge, and the trailing edge end 280 refers to the specific location of the airfoil 200 that is at the aft most edge. As used herein, the leading edge 250 refers to the portion of the airfoil 200 that is at the foremost edge and is the portion of the airfoil 200 that first contacts oncoming air. The leading edge 250 extends from the leading edge end 240 and extends along up to thirty percent, such as up to twenty percent, such as up to ten percent, of a width of the airfoil 200 along the chordwise direction C.

Referring specifically to the exemplary embodiment of FIG. 3, the leading edge member 260 is a sculpted leading edge member 261, and the leading edge 250 is a nonlinear patterned leading edge. For example, for the embodiment shown, the leading edge 250 of the airfoil 200 is a waved leading edge 350 defining a plurality of peaks 354 and a plurality of valleys 352 alternatingly arranged along the spanwise direction S. The airfoil 200, which is outlet guide vane 100 in this example, may be the same, or similar to, the first guide vane 112 as described in U.S. application Ser. No. 17/389,945, filed on Jul. 30, 2021, which is hereby incorporated by reference in its entirety. In another example, the airfoil 200, which is outlet guide vane 100 in this example, may be the same, or similar to, the airfoil 70 as described in U.S. Pat. No. 9,249,666, which is hereby incorporated by reference in its entirety.

Figure 4:
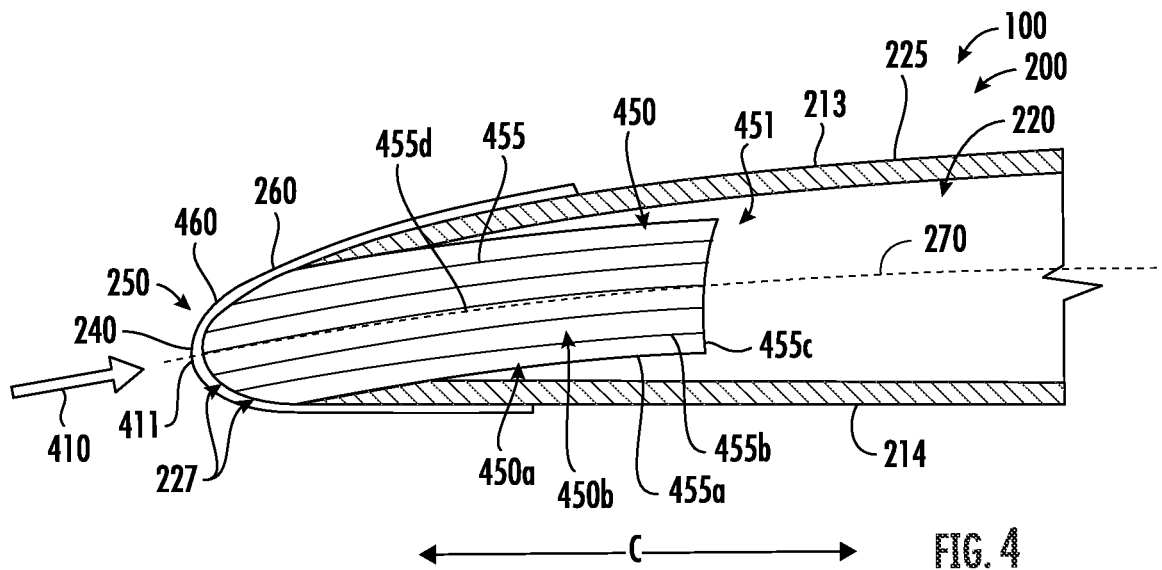
FIG. 4 is a cross-sectional, schematic view of an airfoil in accordance with an exemplary embodiment.

Referring now to FIG. 4, a cross-sectional, schematic view of an airfoil 200 in accordance with an exemplary embodiment is provided. In at least one example, the airfoil 200 of FIG. 4 is the cross-sectional view of the outlet guide vane 100 of FIG. 2 taken along line 4-4 in FIG. 2. In at least one other example, the airfoil 200 of FIG. 4 is the cross-sectional view of the outlet guide vane 100 of FIG. 3 taken along line 4-4 in FIG. 3.

As best seen in this view, the body 220 of the airfoil 200 includes a plurality of cavities 451. Each cavity 450 of the plurality of cavities 451 has an inlet 227 located at the leading edge 250 of the airfoil 200. Positioning the inlets 227 of the plurality of cavities 451 near the leading edge 250 of the airfoil 200 has several benefits. For example, positioning the inlets 227 of the plurality of cavities 451 near the leading edge 250 of the airfoil 200 may increase the amount of noise attenuated by the airfoil. When the airfoil 200 is an outlet guide vane 100, positioning the inlets 227 of the plurality of cavities 451 near the leading edge 250 of the airfoil 200 reduces the noise associated with the wakes generated by the upstream fan 38 of the turbofan engine 10 impinging on the airfoil 200.

Each cavity 450 can extend generally parallel to a camber line 270 of the airfoil 200, which is an imaginary line that lies halfway between the suction side 213 and the pressure side 214 of the airfoil 200 and intersects the chord line (not shown) at the leading edge end 240 and the trailing edge end 280 (FIGS. 2 and 3). As used in this context, generally parallel to the camber line 270 simply means the general direction that each of the cavities 450 extend. For example, the cavities 450 may deviate from being exactly parallel to the camber line 270 by up to ten degrees, such as up to five degrees, such as up to two degrees.

The body 220 of the airfoil 200 can include one or more cavity walls 455 that define a cavity 450. In this example, each of the cavities 450 can be defined by a first cavity wall 455a and a second cavity wall 455b, each of which can extend generally parallel to the camber line 270. Additionally, each of the cavities 450 can be further defined by a third cavity wall 455c. The third cavity wall 455c can extend generally perpendicular to and intersect with the first cavity wall 455a and the second cavity wall 455b. As such, each of the cavities 450 can be a closed cavity such that it includes an inlet 227 but does not include a separate outlet. However, it should be understood that the inlet 227 does not prevent a fluid from exiting the respective cavity 450; as such, the inlet 227 can also be an outlet for fluid to exit the cavity 450. Stated differently, each of the cavities 450 can be a space within the body 220 of the airfoil that includes a singular inlet, the inlet 227, and does not include a separate outlet or additional inlets. In other words, each of the cavities 450 can include only one orifice, which is inlet 227, and does not include any additional orifices such as additional inlets or a separate outlet.

Each of the cavities 450 can have a depth that extends generally along the chordwise direction C. Even though the depth of each of the cavities 450, as depicted in this example, is significantly less than the width of the airfoil 200 along the chordwise direction C, it should be understood that the depth of each of the cavities can be any length. For example, the depth of some, or all, of the cavities 450 can be at least five percent of the width of the airfoil 200 along the chordwise direction C and up to ninety five percent of the width of the airfoil 200 along the chordwise direction C, such as up to ten percent and up to ninety percent of the width of the airfoil 200 along the chordwise direction C, such as up to twenty percent and up to ninety percent of the width of the airfoil 200 along the chordwise direction C.

In other examples, the depth can be greater than ninety percent. For example, each of the cavities 450 may be slanted in relation to the spanwise direction S (in and out of the page in FIG. 4), which will be explained in more detail in relation to FIGS. 5A-6B. When the cavity 450 is slanted in relation to the spanwise direction S, the depth is the length of the cavity 450 along the chordwise direction C divided by the cosine of the angle between the chordwise direction and the direction of the cavity. In these examples, where each of the cavities 450 are slanted in relation to the spanwise direction S, the depth can be at least five percent of the width of the airfoil 200 along the chordwise direction C and up to two hundred percent of the width of the airfoil 200 along the chordwise direction C, such as at least ten percent and up to one hundred fifty percent of the width of the airfoil 200 along the chordwise direction C, such as at least twenty percent and up to two hundred percent of the width of the airfoil 200 along the chordwise direction C, such as at least seventy percent and up to two hundred percent of the width of the airfoil 200 along the chordwise direction C, such as at least ninety percent and up to two hundred percent of the width of the airfoil 200 along the chordwise direction C.

In yet another example, the depth can be greater than ninety percent. For example, each of the cavities 450 may deviate from extending in a singular direction. More specifically, which will be explained in more detail in relation to FIG. 5A-5C, the cavities 450 can be J-shaped, U-shaped, or serpentine-shaped. In the examples where each of the cavities 450 deviate from extending in a singular direction, the depth can be an effective depth. The effective depth can be at least ninety percent of the width of the airfoil 200 along the chordwise direction and up to one thousand five hundred percent of the width of the airfoil 200 along the chordwise direction, such as at least one hundred percent of the width of the airfoil 200 along the chordwise direction and up to one thousand five hundred percent of the width of the airfoil 200 along the chordwise direction, such as at least one hundred fifty percent of the width of the airfoil 200 along the chordwise direction and up to one thousand five hundred percent of the width of the airfoil 200 along the chordwise direction, such as at least three hundred percent of the width of the airfoil 200 along the chordwise direction and up to one thousand five hundred percent of the width of the airfoil 200 along the chordwise direction, such as at least four hundred percent of the width of the airfoil 200 along the chordwise direction and up to one thousand five hundred percent of the width of the airfoil 200 along the chordwise direction.

Each of the cavity walls 455 can be a continuous surface so that fluid within each of the cavities 450 is prevented from flowing to an adjacent cavity 450. Stated differently, each of the cavity walls 455 can be impermeable. For example, the second cavity wall 455b may prevent the fluid within a first cavity 450a from flowing to a cavity 450b, as such, the second cavity wall 455b is impermeable.

The distance between adjacent cavity walls 455, such as first cavity wall 455a and second cavity wall 455b can be greater than 0.25 millimeter and up to twenty millimeters, such as greater than 0.25 millimeter and up to ten millimeters.

Some of the cavity walls 455, such as the second cavity wall 455b, can be positioned between adjacent cavities 450, such as the first cavity 450a and the second cavity 450b. The cavity walls 455 that are positioned between adjacent cavities 450, such as the cavity wall 455b, can be relatively thin, such as less than three millimeters thick, such as less than two millimeters thick, such as less than one millimeter thick.

One of the cavity walls 455 can be positioned on the camber line 270 of the airfoil 200. In this example, a fourth cavity wall 455d is positioned on the camber line 270 of the airfoil 200. The cavity wall 455 that is positioned on the camber line 270 of the airfoil 200 may also be located in line with a streamline 410 at the leading edge stagnation point 411 of the airfoil 200. The leading edge stagnation point 411 of the airfoil 200 is a point in a flow field around the airfoil 200 where the local velocity of the fluid is zero.

In this example, the leading edge stagnation point 411 of the airfoil 200 is proximate to the location where the camber line 270 intersects with the leading edge 250 of the airfoil 200. However, it should be understood that if the airfoil 200 had a larger angle of attack, the leading edge stagnation point 411 may move down towards the pressure side 214 of the airfoil 200. As such, in other examples, one of the cavity walls 455, such as the fourth cavity wall 455d, can be positioned on the leading edge stagnation point 411. Aligning one of the cavity walls 455, such as the fourth cavity wall 455d, with at the leading edge stagnation point 411 of the airfoil 200 and/or the camber line 270 of the airfoil 200 may have the benefit of maintaining the net aerodynamic loading of the airfoil 200.

In some examples, the cavity walls 455 can be produced using additive manufacturing technology, which may allow for certain geometries or features described herein to be produced, which may provide for reduced noise. Additionally, or in the alternative, a cavity wall 455 may be integrally formed with another cell wall or with the body 220 of the airfoil 200.

As also seen in this view, the airfoil 200 includes a porous face sheet 460 positioned along the leading edge 250 of the body 220 of the airfoil 200. The porous face sheet 460, which will be explained further, can be a perforated surface of the airfoil 200 or a perforated component that is separate from the body 220. The porous face sheet 460 can be a microperforated surface and/or can be a mesh formed from, for example, wire, cloth, fibers, and/or filaments, or a combination thereof. The porous face sheet 460 can have a thickness that is greater than 0.5 millimeter thick and less than three millimeters thick, such as greater than 0.5 millimeter thick and less than two millimeters thick. The porous face sheet 460 can have a plurality of holes, each hole having a diameter of less than one millimeter, such as less than 0.5 millimeter.

The porous face sheet 460 can be positioned on the inlet 227 of at least one of the cavities 450. In this example, the porous face sheet 460 is positioned on each inlet 227 of each cavity 450 of the plurality of cavities 451. The porous face sheet 460 can extend a length of up to fifty percent of the chord length of the airfoil, such as up to thirty percent of the chord length of the airfoil 200, such as up to twenty percent of the chord length of the airfoil 200, such as up to ten percent of the chord length of the airfoil 200. In some examples, the porous face sheet 460 can extend further, partially or along the full length of the chord length of the airfoil 200, such that it extends further partially or completely over the pressure side 214 and/or the suction side 213 of the airfoil 200. In yet other examples, the porous face sheet 460 can extend across a majority of the chord length of the airfoil 200, such as at least fifty percent of the chord length of the airfoil 200 and up to ninety nine percent of the chord length of the airfoil, such as at least sixty percent of the chord length of the airfoil 200 and up to eighty percent of the chord length of the airfoil.

Positioning the porous face sheet 460 on the inlet of the cavities 450 has several benefits. For example, and as mentioned, placing the inlet 227 of the cavities 450 on the leading edge 250 of the airfoil 200 can help increase the amount of noise attenuated by the airfoil 200. However, the inlet 227 of the cavities 450 on the leading edge may reduce the aerodynamic performance of the airfoil. As such, the porous face sheet may also improve the aerodynamic performance of the airfoil while also benefiting, at least partially, from the noise attenuation achieved by the cavities 450 on the leading edge of the airfoil 200.

As mentioned, the porous face sheet 460 can be a perforated surface of the airfoil 200, such as a microperforated surface. As shown, the porous face sheet 460 is a separate component and is placed, such as bonded, on top of the skin 225 of the airfoil 200 and is not flush with the skin 225 of the airfoil 200. However, in some examples, the porous face sheet 460 may also be aligned with the skin 225 of the airfoil 200 so that it sits flush with the skin 225 of the airfoil 200. In yet other examples, the porous face sheet 460 is monolithic with at least a portion of the skin 225 of the airfoil 200 and is a perforated portion of the skin 225 of the airfoil 200. For example, the porous face sheet 460 can be formed integrally with the airfoil 200 by laser drilling, additive manufacturing, etc. In yet other examples, the porous face sheet 460 is a perforated metal leading edge member 260 as described in reference to FIG. 2 and FIG. 3.

The skin 225 of the airfoil 200 can be manufactured from a composite or metal material. The term "composite material" as used herein may be defined as a material containing a reinforcement such as fibers or particles supported in a binder or matrix material. Composite materials include metallic and non-metallic composites. One useful embodiment for composite airfoils 200 is made of a unidirectional tape material and an epoxy resin matrix. The composite airfoils 200 disclosed herein may include composite materials of the non-metallic type made of a material containing a fiber such as a carbonaceous, silica, metal, metal oxide, or ceramic fiber embedded in a resin material such as Epoxy, PMR15, BMI, PEEU, etc. A more particular material includes fibers unidirectionally aligned into a tape that is impregnated with a resin, formed into a part shape, and cured via an autoclaving process or press molding to form a light-weight, stiff, relatively homogeneous article having laminates within. However, any suitable composite material and/or formation process may be used.

The porous face sheet 460 and/or the skin 225 of the airfoil 200 can be manufactured from a metal material such as titanium, steel, or aluminum. The porous face sheet 460 can have a porosity of up to thirty percent porosity, such as less than twenty percent porosity, such as less than ten percent porosity. Having a reduced porosity, such as less than thirty percent, can increase the airfoil 200's resistance to mean flow while increasing the ability of the airfoil 200 to attenuate noise. In at least one example, a separate wire mesh cover sheet (not shown) is positioned over the porous face sheet 460 to increase surface resistance.

In some examples, the porous face sheet 460 may extend the full length of the airfoil 200 along the spanwise direction S (FIG. 2 and FIG. 3). However, in some examples, the porous face sheet 460 may extend only up to ninety percent, such as up to eighty percent, such as up to seventy percent, of the length of the airfoil 200 along the spanwise direction. However, in some examples, which will be explained further, the porous face sheet 460 may be selectively positioned on the airfoil 200 and may only extend less than ten percent, such as less than five percent, of the length of the airfoil 200 along the spanwise direction.

Figure 5A:
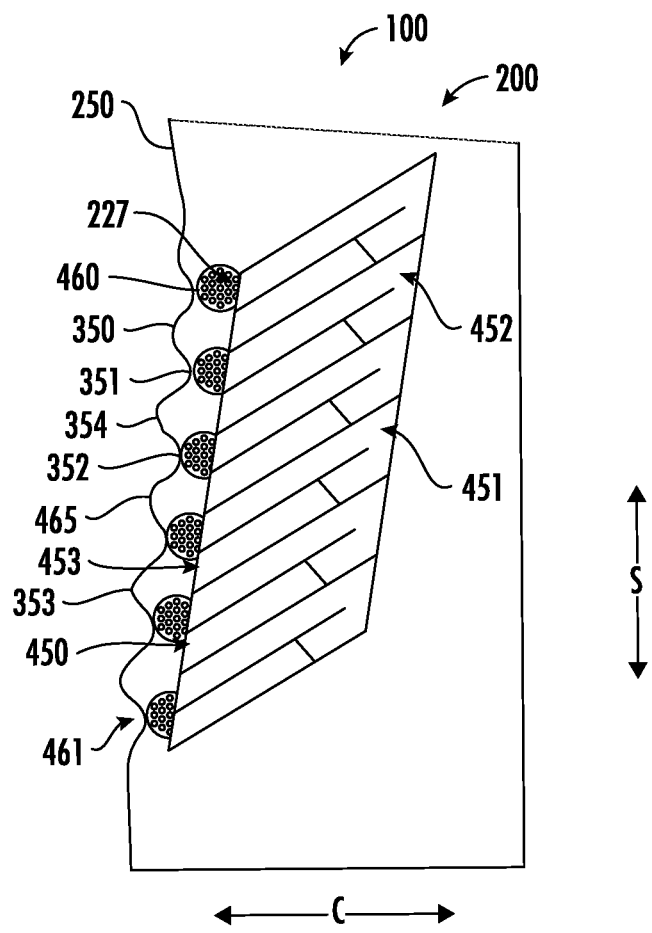
FIG. 5A is a schematic, cross-sectional, side view of an airfoil in accordance with an exemplary embodiment.

Referring now to FIG. 5A, a schematic, cross-sectional, side view of an airfoil 200 in accordance with an exemplary embodiment is provided. More specifically, FIG. 5A provides a schematic, cross-sectional, side view of an outlet guide vane 100 of the plurality of circumferentially-spaced outlet guide vanes 52 (FIG. 1), according to an example embodiment. In this example, the leading edge 250 is a waved leading edge 350 defining a plurality of peaks 354 and a plurality of valleys 352 alternatingly arranged along the spanwise direction S. As used herein, the term "peak" refers to a convex surface of the waved leading edge 350 and the term "valley" refers to a concave surface of the waved leading edge 350.

In this example, the airfoil 200 includes a plurality of porous face sheets 461. Even though each of the porous face sheets 461 are depicted circular, it should be understood that the depiction is a schematic representation and that the porous face sheets 461 may be any shape including circular, but can also be square shaped, oval shaped, or an irregular shape, to name a few examples. Each of the porous face sheets 460 of the plurality of porous face sheets 461 can be positioned in a valley 351 of the plurality of valleys 352 of the waved leading edge 350. In some examples, and as shown, each peak 353 of the plurality of peaks 354 of the waved leading edge 350 do not include a porous face sheet 460. As such, each peak 353 of the plurality of peaks 354 of the waved leading edge 350 includes an impermeable portion 465, in some examples, and as shown.

In some examples, each cavity 450 can be the same or similar to a resonant cell 206 of U.S. application Ser. No. 16/938,150, filed on Jul. 24, 2020, which is hereby incorporated by reference in its entirety. In some examples, the cavities 450 are grouped, forming cavity groups 453. The term "cavity group" refers to a plurality of cavities 451 that are matched or grouped with one another in a pattern that repeats across at least a portion of the airfoil 200. For example, and as depicted in FIG. 5A, each of the cavities 450 can be an oblique cavity 452 and can be the same, or similar to, the oblique resonant cell 1300 that forms a resonant cell group 1200 as depicted in FIG. 13A of U.S. application Ser. No. 16/938,150.

Incorporating oblique cavities 452 into the airfoil 200 may have several advantages. For example, the depth of the cavities 450 is limited by the width of the airfoil 200 along the chordwise direction. As such, to increase the maximum depth of the cavities 450, it may be necessary to angle the cavities 450 in relation to the chord wise direction C. Increasing the maximum depth of the cavities 450 allows for reduction in lower frequency noise. As a person of skill in the art would recognize, the depth of the cavities 450 are adjusted, or tuned, to attenuate certain frequencies. In some examples, the tuned depth of the cavities 450 may be approximately one fourth of the wavelength of the frequency that is desired to be attenuated.

In this example, each cavity 450 within each cavity group 453 can define an inlet 227 that is proximate to a valley 351 of the plurality of valleys 352, the inlet 227 being proximate to a porous face sheet 460. Also, as mentioned, the area proximate to the peaks 354 of the plurality of peaks 354 may be impermeable. This configuration may have several benefits. For example, most of the noise penalties caused by the airfoil 200 may be in the valleys 352. As such, it may be beneficial to include the porous face sheets 460 proximate to only each valley 351 of the plurality of valleys 352 to decrease the amount of noise generated by the airfoil 200 while also decreasing the amount of surface area that includes the porous face sheet 460. Decreasing the amount of surface area of the airfoil 200 that includes the porous face sheet 460 may reduce the aerodynamic drag of the airfoil 200.

Referring now also to FIG. 5B, a schematic, cross-sectional, side view of an airfoil 200 in accordance with an exemplary embodiment is provided. More specifically, FIG. 5A provides a schematic, cross-sectional, side view of an outlet guide vane 100 of the plurality of circumferentially-spaced outlet guide vanes 52 (FIG. 1), according to an example embodiment. The airfoil 200 of FIG. 5B can be the same, or similar to the airfoil 200 of FIG. 5A. However, in this example, each of the cavity groups can extend to the same chordwise location CL, whereas in the example of FIG. 5A, each of the cavity groups extended the same length across the chord. Additionally, in this example, each of the cavity groups 453 are slanted downward, pointing toward the root end 211 of the airfoil 200. Slanting the cavity groups 453 downward may result in the shortest cavities being near the tip end 212 and the longest cavities near the root end 211 of the airfoil. This may be beneficial to noise attenuation because of how the acoustic sources are weighted.

Referring now also to FIG. 5C, a schematic, cross-sectional, side view of an airfoil 200 in accordance with an exemplary embodiment is provided. More specifically, FIG. 5C provides a schematic, cross-sectional, side view of an outlet guide vane 100 of the plurality of circumferentially-spaced outlet guide vanes 52 (FIG. 1), according to an example embodiment. The airfoil 200 of FIG. 5C can be the same, or similar to, the airfoil 200 of FIG. 5A or FIG. 5B. However, in this example, the airfoil 200 includes a plurality of cavities 451 that are each serpentine-shaped. As shown, each of the cavities 450 have an inlet 227 that is located near a valley 351 of the leading edge 250 and at an end of the serpentine shaped cavity 451. In this example, each of the plurality of cavities 450 are closed cavities such that the inlet 227 is the only inlet for the serpentine-shaped cavity 451. In other words, each of the plurality of cavities 450 can be a space within the body 220 of the airfoil 200 that includes the inlet 227, which is the only inlet for the serpentine-shaped cavity 451.

Referring now also to FIG. 5D, a schematic, cross-sectional, side view of an airfoil 200 in accordance with an exemplary embodiment is provided. More specifically, FIG. 5D provides a schematic, cross-sectional, side view of an outlet guide vane 100 of the plurality of circumferentially-spaced outlet guide vanes 52 (FIG. 1), according to an example embodiment. The airfoil 200 of FIG. 5D can be the same, or similar to, the airfoil 200 of FIG. 5C. However, in this example, each of the cavity groups 453 can conform to the shape of the leading edge end 240. The shape of each of the cavity groups 453 can be, as shown, irregular and/or different than the shape of some of the other cavity groups 453 within the airfoil 200.

Referring now also to FIG. 6A, a schematic, cross-sectional, side view of a cavity group 453 of the airfoil 200 of FIG. 5A, FIG. 5B, FIG. 5C, or FIG. 5D in accordance with an exemplary embodiment is provided. As mentioned, the cavity group 453 includes a plurality of cavities 451. In this example, the cavity group 453 includes a first cavity 450a and a second cavity 450b, a depth D2 of the first cavity 450a can be different than a depth D1 of the second cavity 450b. For example, the depth D2 of the first cavity 450a can differ from the depth D1 of the second cavity 450b by at least five percent and up to two thousand percent, such as at least five percent and up to fifteen hundred percent, such as at least five percent and up to one thousand percent, such as at least five percent and up to five hundred percent (calculated by (D1−D2)/D2). In this example, depth D1 is the distance from the porous face sheet 460 to the third cavity wall 455c and depth D2 is the distance from the porous face sheet 460 to a partition 456. Also in this example, the second cavity 450b also includes an effective depth D3 due to the "J" shape of the second cavity 450b. Depth D3 is the distance of the J-shaped path from the porous face sheet 460 to the partition 456. The effective depth D3 of the second cavity 450b can differ from the depth D2 of the first cavity 450 by at least five percent and up to four thousand percent, such as at least five percent and up to fifteen hundred percent, such as at least five percent and up to one thousand percent, such as at least five percent and up to five hundred percent (calculated by (D3−D2)/D2).

Having differing depths of the plurality of cavities 451 has several benefits. For example, the depth of each cavity 450 may be tuned or configured to attenuate specific frequency sound waves. For example, the first cavity 450a may be tuned and/or configured to attenuate high-frequency sound waves, whereas the second cavity 450b may be tuned and/or configured to attenuate low-frequency sound waves and/or intermediate frequency sound waves. In at least one example, the depth of each cavity 450 may be tuned or configured to attenuate specific frequency sound waves by adjusting the depth of each cavity 450 to be approximately one fourth of the wavelength of the frequency that is desired to be attenuated.

As mentioned, in this example, the second cavity 450b is shaped like the letter "J", whereas the first cavity 450a extends from the hook of the second cavity 450b to the porous face sheet 460. Each of the plurality of cavities 450, in this example the first cavity 450*a* and the second cavity 450*b*, includes an inlet 227. One of the porous face sheets 460 of the plurality of porous face sheets 461 (FIG. 5A-FIG. 5C) can be positioned on the inlet 227 of each cavity 450. In this example, the porous face sheet 460 is positioned on the inlet 227 of both the first cavity 450*a* and the second cavity 450*b*. As shown, the first cavity 450*a* can be defined by a first cavity wall 455*a*, a fourth cavity wall 455*d*, and a partition 456; the second cavity 450*b* can be defined by the first cavity wall 455*a*, a second cavity wall 455*b*, a third cavity wall 455*c*, the fourth cavity wall 455*d*, and the partition 456. As shown, the partition 456 is integrally formed with or connected to the fourth cavity wall 455*d* and the first cavity wall 455*a* and serves to fluidly separate the first cavity 450*a* from the second cavity 450*b*. However, in some examples, the partition 456 can include apertures to fluidly connect the first cavity 450*a* to the second cavity 450*b*. As shown, cavity walls 455*a*, 455*b*, and 455*d*, and the partition 456 can be oriented obliquely relative to the spanwise direction S and the chordwise direction C. The third cavity wall 455*c* can be generally parallel to the spanwise direction S.

Figure 6B:
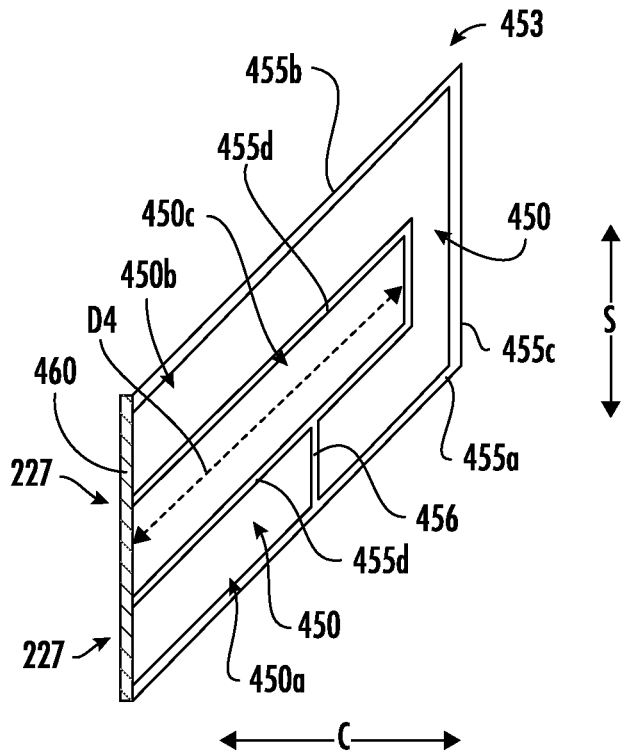
FIG. 6B is a schematic, cross-sectional, side view of a cavity group of the airfoil of FIG. 5A, FIG. 5B, FIG. 5C, or FIG. 5D in accordance with an exemplary embodiment.

Referring now also to FIG. 6B, a schematic, cross-sectional, side view of a cavity group 453 of the airfoil 200 of FIG. 5A, FIG. 5B, FIG. 5C, or FIG. 5D in accordance with an exemplary embodiment is provided. The cavity group 453 of FIG. 6B can be similar to the cavity group 453 of FIG. 6A. However, in this example, the cavity group 453 includes a third cavity 450*c* that is positioned between the first cavity 450*a* and the second cavity 450*b*. Additionally, the partition 456 may extend in the spanwise direction S, instead of extending perpendicular to cavity walls 455*a* and 455*d*, as depicted in FIG. 6A.

Figure 6C:
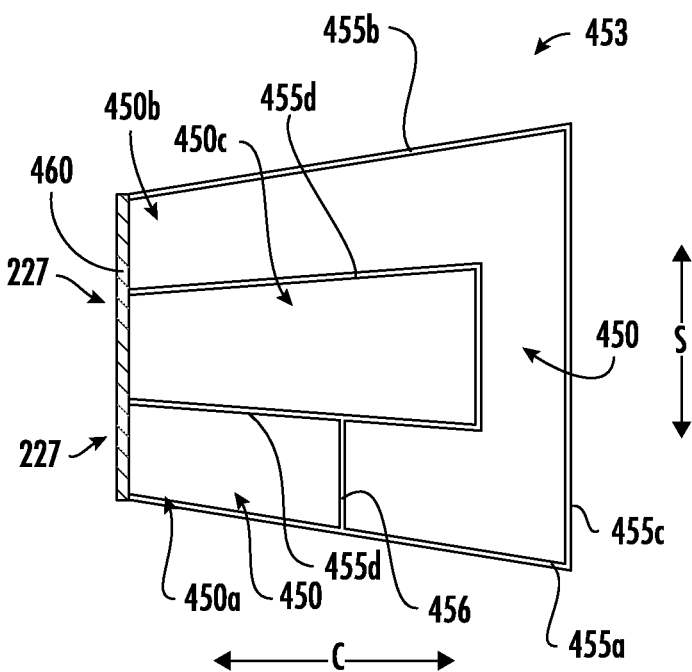
FIG. 6C is a schematic, cross-sectional, side view of a cavity group of the airfoil of FIG. 5A, FIG. 5B, FIG. 5C, OR FIG. 5D in accordance with an exemplary embodiment.

Referring now also to FIG. 6C, a schematic, cross-sectional, side view of a cavity group 453 of the airfoil 200 of FIG. 5A, FIG. 5B, FIG. 5C, or FIG. 5D in accordance with an exemplary embodiment is provided. The cavity group 453 of FIG. 6C can be similar to the cavity group 453 of FIG. 6B. However, in this example, cavity wall 455*a* and cavity wall 455*b* both extend away from the third cavity 450*c*.

The cavity group 453 as described in reference to FIG. 6A, FIG. 6B, or FIG. 6C can have any number of cavities 450. For example, each cavity group 453 can have four, five, or six cavities. In yet other examples, each cavity group 453 can have seven or more cavities, such as up to ten cavities.

Figure 7:
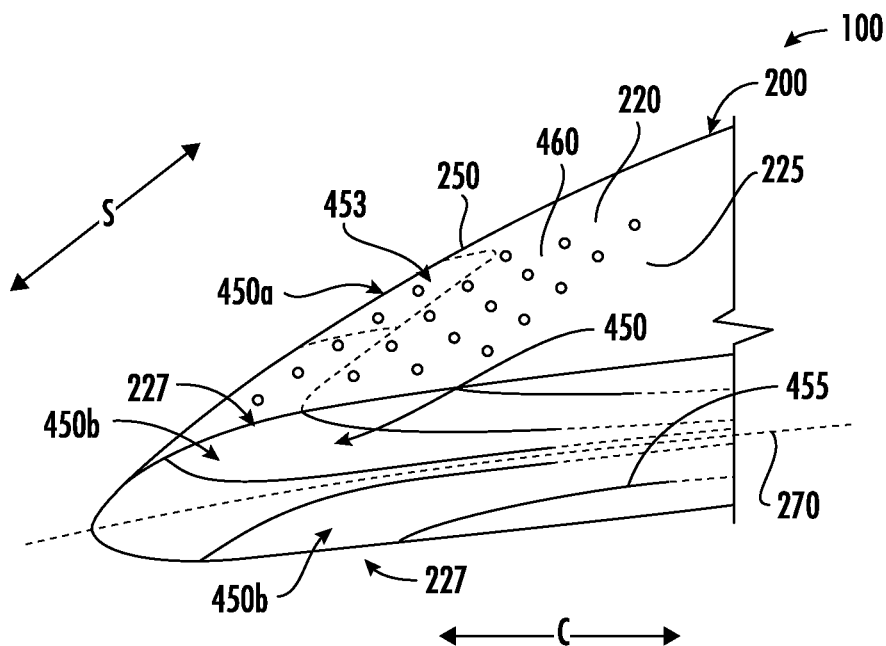
FIG. 7 is a cross-sectional, perspective view of an airfoil in accordance with an exemplary embodiment.

Referring now to FIG. 7, a cross-sectional, perspective view of an airfoil 200 in accordance with an exemplary embodiment is provided. More specifically, FIG. 7 provides a cross-sectional, perspective view of an outlet guide vane 100 of the plurality of circumferentially-spaced outlet guide vanes 52 (FIG. 1), according to an example embodiment. In the example of FIG. 7, the airfoil 200 includes a cavity group 453, which includes a first cavity 450*a* and a second cavity 450*b*. In some examples, the cavity walls 455 defining the cavity groups 453 can be oriented obliquely in relation to the chordwise direction C and the spanwise direction S. As best seen in this example, the inlet 227 of each cavity 450 may not be linearly shaped. Instead, and as depicted, the inlet 227 may slope away from the camber line 270 of the airfoil 200 to extend toward the skin 225 of the body 220 of the airfoil 200.

Figure 8:
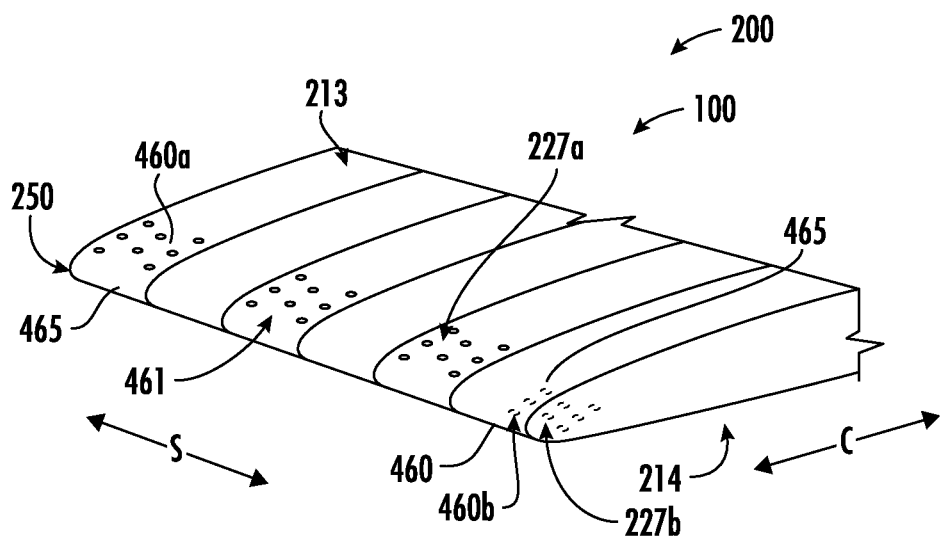
FIG. 8 is a cross-sectional, perspective view of an airfoil in accordance with an exemplary embodiment.

Referring now to FIG. 8, a cross-sectional, perspective view of an airfoil 200 in accordance with an exemplary embodiment is provided. More specifically, FIG. 8 provides a cross-sectional, perspective view of an outlet guide vane 100 of the plurality of circumferentially-spaced outlet guide vanes 52 (FIG. 1), according to an example embodiment. In this example, the airfoil 200 includes a plurality of porous face sheets 461. The plurality of porous face sheets 461 include at least one pressure side porous face sheet 460*b* and at least one suction side porous face sheet 460*a*. The pressure side porous face sheets 460*b* are located on the pressure side 214 of the airfoil 200 and the suction side porous face sheets 460*a* are located on the suction side 213 of the airfoil 200. The plurality of porous face sheets 461 alternate between pressure side porous face sheets 460*b* and suction side porous face sheets 460*a* along the spanwise direction S of the airfoil 200. As such, at least one of the pressure side porous face sheets 460*b* are positioned adjacent to a suction side porous face sheets 460*a* along the spanwise direction S.

Additionally, and as shown, impermeable portions 465 are positioned between adjacent porous face sheets 460 along the spanwise direction S. Stated differently, each of the porous face sheets 460 are positioned adjacent to an impermeable portion 465 along the spanwise direction S. As shown, the impermeable portions 465 are positioned adjacent to one of the porous face sheets 460 along the chordwise direction C. The placement of each of the porous face sheets 460 and each of the impermeable portions 465 can be defined according to the radial mode shapes of the dominant acoustic tones of interest for attenuation. By discretely treating some portions of the airfoil 200 and not others, with reference to the radial mode shapes, increased noise cancelation (i.e., destructive interference) may be attained while partitioning the treatment according to the restricted volume enclosed by the airfoil 200 (alternating between suction side and pressure side treatment e.g.).

Although not depicted in this view, the airfoil 200 includes suction side cavities and pressure side cavities. The suction side cavities include a suction side inlet 227*a* and the pressure side cavities include a pressure side inlet 227*b*. The suction side cavities and the pressure side cavities can be oriented obliquely relative to the spanwise direction S and/or the chordwise direction C, as described in reference to FIG. 5A.

Alternating between suction side cavities 450*c* and pressure side cavities 450*d* has several benefits. For example, this configuration may increase the discretizing of the acoustic response in the spanwise direction to optimize the destructive interference associated with radiated noise by referencing the radial mode shapes and noise source distribution of the dominant noise tones of interest. Additionally, this configuration may increase the overall smoothness of the leading edge 250 of the airfoil 200, which may decrease aerodynamic drag.

Referring briefly back to also FIG. 5A, FIG. 5B, or FIG. 5C, each of the porous face sheets 460 of the plurality of porous face sheets 461 can be located in a valley 351 of the plurality of valleys 352 of the waved leading edge 350. In some examples, and as shown, each peak 353 of the plurality of peaks 354 of the waved leading edge 350 does not include a porous face sheet 460 and instead includes an impermeable portion 465. Also, in some examples, the porous face sheets 460 are only located on a suction side 213 or a pressure side 214 of the airfoil 200. As such, the other of the suction side 213 or the pressure side 214 of the airfoil 200 includes only the impermeable portion 465. Including the porous face sheet 460 on only one of the suction side 213 or the pressure side 214 of the airfoil 200 may reduce the amount of aerodynamic drag experienced from the porous face sheet 460.

Figure 9:
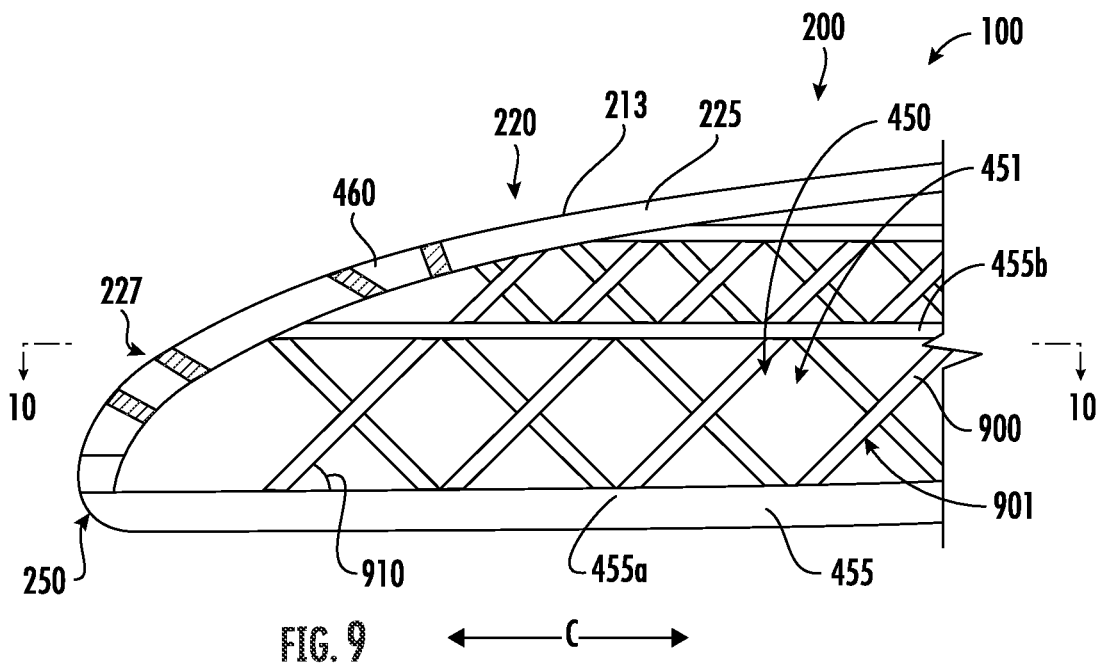
FIG. 9 is a cross-sectional, side view of an airfoil in accordance with an exemplary embodiment.
Figure 10:
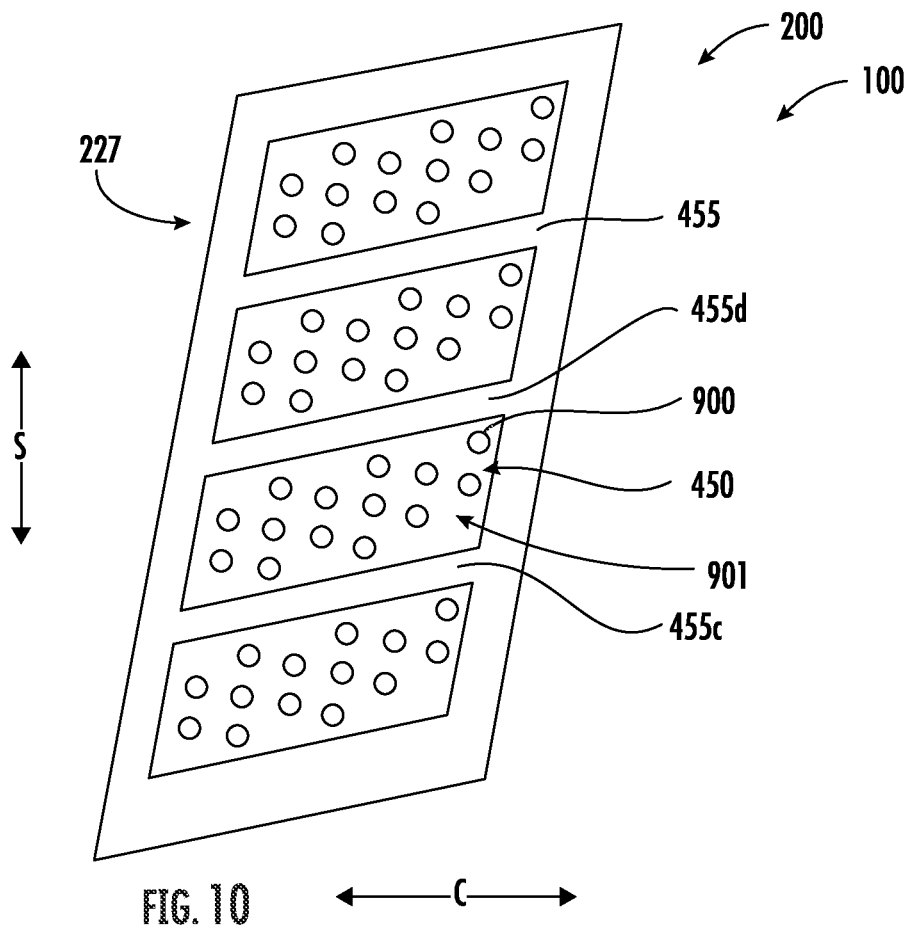
FIG. 10 is a cross-sectional, top view of the airfoil of FIG. 9 in accordance with an exemplary embodiment.

Referring now to FIG. 9 and FIG. 10, FIG. 9 depicts a cross-sectional, side view of an airfoil 200, in accordance with an exemplary embodiment, and FIG. 10 depicts a cross-sectional, top view of the airfoil 200 of FIG. 9, along line 10-10, in accordance with an exemplary embodiment. More specifically, FIG. 9 depicts a cross-sectional, side view of an outlet guide vane 100 of the plurality of circumferentially-spaced outlet guide vanes 52 (FIG. 1), according to one example, and FIG. 10 depicts a cross-sectional, top view of the outlet guide vane 100 of FIG. 9, along line 10-10, according to one example.

As can be best seen in FIG. 9, each of the cavities 450 of the plurality of cavities 451 can include a plurality of embedded elements 901. Each of the embedded elements 900 of the plurality of embedded elements 901 can extend from a first cavity wall 455a to a second cavity wall 455b. For example, and as shown, each of the embedded elements 900 of the plurality of embedded elements 901 extend continuously from the first cavity wall 455a to the second cavity wall 455b. In this example, the first cavity wall 455a and the second cavity wall 455b extend generally along a plane defined by the chordwise direction C of the airfoil 200 and the span wise direction S (in and out of page of FIG. 9) of the airfoil 200. An angle, angle 910, is formed between each of the embedded elements 900 of the plurality of embedded elements 901 and the plane defined by the chordwise direction C and the span wise direction S. In this example, angle 910 is approximately forty-five degrees, such as thirty-five degrees to fifty-five degrees. However, in other examples, angle 910 can be approximately ninety degrees, such as eighty degrees to ninety degrees. In yet other examples, angle 910 can range from fifty-five degrees to eighty degrees.

As best seen in FIG. 10, each of the embedded elements 900 only extend partially in the spanwise direction and in the chordwise direction and do not extend from a third cavity walls 455c and a fourth cavity wall 455d that extends generally perpendicularly to the plane defined by the spanwise direction S and the chordwise direction C. Also, as best seen in this view, each of the embedded elements 900 is generally cylinder shaped. However, each of the embedded elements 900 may be any shape. For example, each of the embedded elements 900 can be shaped like a polyhedron, such as a tetrahedron, a hexagonal prism, a tetragonal frustrum, a hexagonal frustrum, a cuboid, etc. In other examples, each of the embedded elements 900 can be shaped like a cone or a cylindrical annulus. In yet other examples, each of the embedded elements 900 can be irregular shaped such that they include curved surfaces and flat surfaces, fillets or rounded surface intersections, etc. In some examples, each of the embedded elements within the cavity 450 are the same shape. In other examples, at least one of the embedded elements within the cavity 450 is a different shape than another one of the embedded elements 900 within the cavity 450.

Including embedded elements 900 within each of the cavities 450 of the plurality of cavities 451 of the airfoil 200 has several benefits. First, the size and shape and packing density of the embedded elements 900 can be adjusted, or tuned, to attenuate a specific range of resonant frequencies by effectively changing the acoustic impedance of the plurality of cavities 451. For example, the embedded elements 900 allow the tuning of the resonant frequencies to lower frequencies. Second, the embedded elements 900 may provide structural support for the airfoil 200 when the airfoil 200 experiences a load. More specifically, the embedded elements 900 may provide structural support for the cell walls of the airfoil 200 that extend generally along the plane defined by the spanwise direction S and the chord wise direction C. Third, the embedded elements 900 may assist with additively manufacturing the cavity walls 455 of the airfoil 200. More specifically, the embedded elements 900 may provide support to the cavity walls 455 of the airfoil 200 that extend generally along the plane defined by the spanwise direction S and the chordwise direction C (first cavity wall 455a and second cavity wall 455b) when those walls are being additively manufactured.

This written description uses examples to disclose the preferred embodiments, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

An airfoil defining a spanwise direction, a chordwise direction, a root end, a tip end, a leading edge end, and a trailing edge end, the airfoil comprising: a leading edge extending from the leading edge end; a body extending along the spanwise direction between the root end and the tip end, the body comprising a plurality of cavity walls defining a plurality of cavities, each of the plurality of cavities having an inlet located at the leading edge; and a porous face sheet positioned on at least one inlet of the plurality of cavities.

The airfoil of any preceding clause, wherein each cavity of the plurality of cavities includes only one inlet.

The airfoil of any preceding clause, wherein each cavity of the plurality of cavities extends generally parallel to a camber line of the airfoil.

The airfoil of any preceding clause, wherein the leading edge defines a plurality of peaks and a plurality of valleys alternatingly arranged along the spanwise direction.

The airfoil of any preceding clause, wherein each of the inlets of the plurality of cavities is positioned in a valley of the plurality of valleys, and wherein the porous face sheet is a plurality of porous face sheets and each of the plurality of porous face sheets are positioned in a valley of the plurality of valleys.

The airfoil of any preceding clause, wherein the airfoil comprises a plurality of impermeable portions, wherein each of the impermeable portions of the plurality of impermeable portions are positioned on a peak of the plurality of peaks.

The airfoil of any preceding clause, wherein the airfoil defines a pressure side and a suction side, wherein each of the porous face sheets of the plurality of porous face sheets are positioned on one of the suction side or the pressure side.

The airfoil of any preceding clause, wherein the airfoil includes a cavity group that comprises the plurality of cavities, wherein the cavity group comprises a first cavity having a first depth and a second cavity having a second depth, wherein the first depth differs from the second depth by at least ten percent and up to two thousand percent.

The airfoil of any preceding clause, wherein a cavity wall of the plurality of cavity walls is oriented obliquely relative to the spanwise direction.

The airfoil of any preceding clause, wherein the porous face sheet is a plurality of porous face sheets and the airfoil comprises a plurality of impermeable portions, wherein at least one impermeable portion is positioned between two porous face sheets of the plurality of porous face sheets along the spanwise direction.

The airfoil of any preceding clause, wherein the airfoil is an outlet guide vane for a propulsion system, wherein the propulsion system is a turbofan engine, a hybrid electric propulsion system, or an electric propulsion system, and wherein the propulsion system comprises a fan section having a fan, and wherein the outlet guide vane is positioned downstream of the fan.

The airfoil of any preceding clause, wherein at least one cavity of the plurality of cavities is J-shaped.

The airfoil of any preceding clause, wherein at least one cavity of the plurality of cavities is U-shaped.

The airfoil of any preceding clause, wherein at least one cavity of the plurality of cavities is serpentine-shaped.

The airfoil of any preceding clause, wherein at least one cavity of the plurality of cavities slanted toward the root end of the airfoil.

The airfoil of any preceding clause, wherein at least one cavity of the plurality of cavities slanted toward the tip end of the airfoil.

The airfoil of any preceding clause, wherein the cavity group comprises at least two cavities.

The airfoil of any preceding clause, wherein the cavity group comprises only two cavities.

The airfoil of any preceding clause, wherein the cavity group comprises at least four cavities.

The airfoil of any preceding clause, wherein the cavity group comprises only four cavities.

A turbofan engine comprising: a fan section that comprises a fan having a plurality of fan blades; a turbomachine disposed downstream from the fan section, the turbomachine comprising a compressor section, a combustion section, and a turbine section in serial flow arrangement; and a plurality of circumferentially-spaced outlet guide vanes that are positioned downstream of the fan, wherein each of the outlet guide vanes define a spanwise direction, a chordwise direction, a root end, a tip end, a leading edge end, and a trailing edge end, each of the outlet guide vanes comprising: a leading edge extending from the leading edge end; a body extending along the spanwise direction between the root end and the tip end, the body comprising a plurality of cavity walls defining a plurality of cavities, each of the plurality of cavities having an inlet located at the leading edge; and a porous face sheet positioned on at least one inlet of the plurality of cavities.

The turbofan engine of any preceding clause, wherein each cavity of the plurality of cavities includes only one inlet.

The turbofan engine of any preceding clause, wherein each cavity of the plurality of cavities extends generally parallel to a camber line of the airfoil.

The turbofan engine of any preceding clause, wherein the leading edge defines a plurality of peaks and a plurality of valleys alternatingly arranged along the spanwise direction, wherein each of the inlets of the plurality of cavities is positioned in a valley of the plurality of valleys, and wherein the porous face sheet is a plurality of porous face sheets and each of the plurality of porous face sheets are positioned in a valley of the plurality of valleys.

The turbofan engine of any preceding clause, wherein the airfoil comprises a plurality of impermeable portions, wherein each of the impermeable portions of the plurality of impermeable portions are positioned on a peak of the plurality of peaks.

The turbofan engine of any preceding clause, wherein the airfoil defines a pressure side and a suction side, wherein each of the porous face sheets of the plurality of porous face sheets are positioned on one of the suction side or the pressure side.

The turbofan engine of any preceding clause, wherein the airfoil includes a cavity group that comprises the plurality of cavities, wherein the cavity group comprises a first cavity having a first depth and a second cavity having a second depth, wherein the first depth differs from the second depth by at least ten percent and up to two thousand percent.

The turbofan engine of any preceding clause, wherein a cavity wall of the plurality of cavity walls is oriented obliquely relative to the spanwise direction.

The turbofan engine of any preceding clause, wherein the porous face sheet is a plurality of porous face sheets and the airfoil comprises a plurality of impermeable portions, wherein at least one impermeable portion is positioned between two porous face sheets of the plurality of porous face sheets along the spanwise direction.

The turbofan engine of any preceding clause, wherein at least one cavity of the plurality of cavities is J-shaped.

The turbofan engine of any preceding clause, wherein at least one cavity of the plurality of cavities is U-shaped.

The turbofan engine of any preceding clause, wherein at least one cavity of the plurality of cavities is serpentine-shaped.

The turbofan engine of any preceding clause, wherein at least one cavity of the plurality of cavities slanted toward the root end of the airfoil.

The turbofan engine of any preceding clause, wherein at least one cavity of the plurality of cavities slanted toward the tip end of the airfoil.

The turbofan engine of any preceding clause, wherein the cavity group comprises at least two cavities.

The turbofan engine of any preceding clause, wherein the cavity group comprises only two cavities.

The turbofan engine of any preceding clause, wherein the cavity group comprises at least four cavities.

The turbofan engine of any preceding clause, wherein the cavity group comprises only four cavities.

What is claimed is:

1. An airfoil defining a spanwise direction, a chordwise direction, a root end, a tip end, a leading edge end, and a trailing edge end, the airfoil comprising:
    a leading edge extending from the leading edge end;
    a body extending along the spanwise direction between the root end and the tip end, the body comprising a plurality of cavity walls defining a plurality of cavities, each of the plurality of cavities having an inlet located at the leading edge; and
    a porous face sheet positioned on at least one inlet of the plurality of cavities, wherein the porous face sheet is a plurality of porous face sheets,
    wherein the airfoil defines a pressure side and a suction side,
    wherein the plurality of porous face sheets include a plurality of first side porous face sheets located on the pressure side of the airfoil and a plurality of second side porous face sheets located on the suction side of the airfoil; and
    wherein the plurality of porous face sheets alternate between the plurality of first side porous face sheets and the plurality of second side porous face sheets along the spanwise direction of the airfoil.

2. The airfoil of claim 1, wherein each cavity of the plurality of cavities includes only one inlet.

3. The airfoil of claim 2, wherein each cavity of the plurality of cavities extends generally parallel to a camber line of the airfoil.

4. The airfoil of claim 1, wherein the leading edge defines a plurality of peaks and a plurality of valleys alternatingly arranged along the spanwise direction.

5. The airfoil of claim 4, wherein each of the inlets of the plurality of cavities is positioned in a valley of the plurality of valleys, and wherein each of the plurality of porous face sheets are positioned in a valley of the plurality of valleys.

6. The airfoil of claim 5, wherein the airfoil comprises a plurality of impermeable portions, wherein each of the impermeable portions of the plurality of impermeable portions are positioned on a peak of the plurality of peaks.

7. The airfoil of claim 1, wherein the plurality of porous face sheets include a pressure side porous face sheet and a suction side porous face sheet, and wherein the pressure side porous face sheet is located on the pressure side of the airfoil and the suction side porous face sheet is located on the suction side of the airfoil.

8. The airfoil of claim 1, wherein the airfoil includes a cavity group that comprises the plurality of cavities, wherein the cavity group comprises a first cavity having a first depth and a second cavity having a second depth, wherein the first depth differs from the second depth by at least ten percent and up to two thousand percent.

9. The airfoil of claim 1, wherein a cavity wall of the plurality of cavity walls is oriented obliquely relative to the spanwise direction and the chordwise direction.

10. The airfoil of claim 1, wherein the porous face sheet is a plurality of porous face sheets and the airfoil comprises a plurality of impermeable portions, wherein at least one impermeable portion is positioned between two porous face sheets of the plurality of porous face sheets along the spanwise direction.

11. The airfoil of claim 1, wherein the airfoil is an outlet guide vane for a propulsion system, wherein the propulsion system is a turbofan engine, a hybrid electric propulsion system, or an electric propulsion system, and wherein the propulsion system comprises a fan section having a fan, and wherein the outlet guide vane is positioned downstream of the fan.

12. A turbofan engine comprising:
a fan section that comprises a fan having a plurality of fan blades;
a turbomachine disposed downstream from the fan section, the turbomachine comprising a compressor section, a combustion section, and a turbine section in serial flow arrangement; and
a plurality of circumferentially-spaced outlet guide vanes that are positioned downstream of the fan, wherein each of the outlet guide vanes define a spanwise direction, a chordwise direction, a root end, a tip end, a leading edge end, and a trailing edge end, each of the outlet guide vanes comprising:
a leading edge extending from the leading edge end;
a body extending along the spanwise direction between the root end and the tip end, the body comprising a plurality of cavity walls defining a plurality of cavities, each of the plurality of cavities having an inlet located at the leading edge; and
a porous face sheet positioned on at least one inlet of the plurality of cavities,
wherein the porous face sheet is a plurality of porous face sheets,
wherein each of the outlet guide vanes define a pressure side and a suction side,
wherein the plurality of porous face sheets include a plurality of first side porous face sheets located on the pressure side of the airfoil and a plurality of second side porous face sheets located on the suction side of the airfoil; and
wherein the plurality of porous face sheets alternate between the plurality of first side porous face sheets and the plurality of second side porous face sheets along the spanwise direction of the airfoil.

13. The turbofan engine of claim 12, wherein each cavity of the plurality of cavities is a closed cavity.

14. The turbofan engine of claim 12, wherein each cavity of the plurality of cavities extends generally parallel to a camber line of the airfoil.

15. The turbofan engine of claim 12, wherein the leading edge defines a plurality of peaks and a plurality of valleys alternatingly arranged along the spanwise direction, wherein each of the inlets of the plurality of cavities is positioned in a valley of the plurality of valleys, and wherein each of the plurality of porous face sheets are positioned in a valley of the plurality of valleys.

16. The airfoil of claim 15, wherein the airfoil comprises a plurality of impermeable portions, wherein each of the impermeable portions of the plurality of impermeable portions are positioned on a peak of the plurality of peaks.

17. The airfoil of claim 12, wherein the plurality of porous face sheets include a pressure side porous face sheet and a suction side porous face sheet, and wherein the pressure side porous face sheet is located on the pressure side of each of the outlet guide vanes and the suction side porous face sheet is located on the suction side of each of the outlet guide vanes.

18. The turbofan engine of claim 12, wherein the airfoil includes a cavity group that comprises the plurality of cavities, wherein the cavity group comprises a first cavity having a first depth and a second cavity having a second depth, wherein the first depth differs from the second depth by at least ten percent and up to two thousand percent.

19. The turbofan engine of claim 12, wherein a cavity wall of the plurality of cavity walls is oriented obliquely relative to the spanwise direction and the chordwise direction.

20. The turbofan engine of claim 12, wherein the porous face sheet is a plurality of porous face sheets and the airfoil comprises a plurality of impermeable portions, wherein at least one impermeable portion is positioned between two porous face sheets of the plurality of porous face sheets along the spanwise direction.

* * * * *